United States Patent
Ix et al.

(10) Patent No.: US 12,230,914 B2
(45) Date of Patent: Feb. 18, 2025

(54) UNIVERSAL LOAD BEARING CABLE CONNECTOR

(71) Applicant: IN-SITU, INC., Fort Collins, CO (US)

(72) Inventors: Michael Ix, Fort Collins, CO (US); Aaron Beese, Fort Collins, CO (US); Elijah Lyle Scott, Fort Collins, CO (US)

(73) Assignee: IN-SITU, INC., Fort Collins, CO (US)

( * ) Notice: Subject to any disclaimer, the term of this patent is extended or adjusted under 35 U.S.C. 154(b) by 113 days.

(21) Appl. No.: 17/799,785

(22) PCT Filed: Feb. 25, 2021

(86) PCT No.: PCT/US2021/019609
§ 371 (c)(1),
(2) Date: Aug. 15, 2022

(87) PCT Pub. No.: WO2021/173799
PCT Pub. Date: Sep. 2, 2021

(65) Prior Publication Data
US 2023/0079652 A1 Mar. 16, 2023

Related U.S. Application Data

(60) Provisional application No. 62/981,388, filed on Feb. 25, 2020.

(51) Int. Cl.
*H01R 4/48* (2006.01)
*H01R 13/52* (2006.01)
*H01R 13/58* (2006.01)
*H01R 31/06* (2006.01)
*H01R 13/523* (2006.01)

(52) U.S. Cl.
CPC ......... *H01R 13/5219* (2013.01); *H01R 4/489* (2013.01); *H01R 13/58* (2013.01); *H01R 31/06* (2013.01); *H01R 13/523* (2013.01)

(58) Field of Classification Search
CPC .. H01R 13/5219; H01R 13/58; H01R 13/523; H01R 4/489; H01R 31/06
See application file for complete search history.

(56) References Cited

U.S. PATENT DOCUMENTS 1,710,416 A * 4/1929 Goeller ............... H01R 4/5025
439/805
1,739,740 A 12/1929 Stoeltzlen
(Continued)

OTHER PUBLICATIONS

International Search Report and Written Opinion issued in PCT/US2021/019609 on May 6, 2021.
(Continued)

*Primary Examiner* — Thanh Tam T Le
(74) *Attorney, Agent, or Firm* — Leydig, Voit & Mayer, Ltd.

(57) ABSTRACT

Provided are load bearing universal adaptors for connecting electrical cables in a watertight configuration. The mechanical advantage associated with wedges in a tapered cavity ensures that load is appropriately transferred to the walls of the wedge housing. In this manner, a load applied to the electrical cable is at least partially provided to the walls of the system rather than acting to pull the cable out of the adaptor, and the object to which the adaptor is connected, such as a terminal block.

18 Claims, 16 Drawing Sheets

(56) References Cited

U.S. PATENT DOCUMENTS

| | | | | |
|---|---|---|---|---|
| 2,279,508 | A | * | 4/1942 | Bergan ................ H01R 4/5025 |
| | | | | 439/805 |
| 3,345,454 | A | | 10/1967 | Mixon, Jr. |
| 3,681,512 | A | | 8/1972 | Werner et al. |
| 3,761,602 | A | | 9/1973 | De Sio et al. |
| 3,826,860 | A | | 7/1974 | De Sio et al. |
| 3,952,377 | A | | 4/1976 | Morell |
| 3,999,418 | A | | 12/1976 | Morell |
| 4,156,554 | A | | 5/1979 | Aujla |
| 5,123,860 | A | | 6/1992 | Kamei et al. |
| 5,337,601 | A | | 8/1994 | Becker et al. |
| 5,573,423 | A | | 11/1996 | Lin et al. |
| 5,596,193 | A | | 1/1997 | Chutjian et al. |
| 5,682,796 | A | | 11/1997 | Malone |
| 5,719,393 | A | | 2/1998 | Chutjian et al. |
| 6,071,155 | A | * | 6/2000 | Liang ................ H01R 4/5025 |
| | | | | 439/805 |
| 6,149,455 | A | * | 11/2000 | Levi ................ H01R 13/59 |
| | | | | 439/321 |
| 6,157,029 | A | | 12/2000 | Chutjian et al. |
| 6,176,716 | B1 | | 1/2001 | Mercurio et al. |
| 6,268,565 | B1 | * | 7/2001 | Daoud ................ H02G 3/0675 |
| | | | | 285/348 |
| 6,305,944 | B1 | | 10/2001 | Henry et al. |
| 6,356,792 | B1 | * | 3/2002 | Errico ................ A61N 1/0539 |
| | | | | 607/116 |
| 6,508,669 | B2 | * | 1/2003 | Wang ................ H01R 13/59 |
| | | | | 439/598 |
| 6,582,248 | B2 | * | 6/2003 | Bachman ............ H01R 13/533 |
| | | | | 439/461 |
| 6,677,861 | B1 | | 1/2004 | Henry et al. |
| 6,736,674 | B2 | * | 5/2004 | Korte ................ H01R 9/0527 |
| | | | | 439/578 |
| 6,798,347 | B2 | | 9/2004 | Henry et al. |
| 6,805,588 | B2 | * | 10/2004 | Yamamoto ............ H01R 13/59 |
| | | | | 439/607.41 |
| 6,848,934 | B1 | | 2/2005 | McCarthy |
| 6,928,864 | B1 | | 8/2005 | Henry et al. |
| 6,938,506 | B2 | | 9/2005 | Henry et al. |
| 7,007,541 | B2 | | 3/2006 | Henry et al. |
| 7,138,926 | B2 | | 11/2006 | Henry et al. |
| 7,467,979 | B2 | * | 12/2008 | Colescott ............ H01R 4/5091 |
| | | | | 439/805 |
| 7,690,868 | B2 | | 4/2010 | Wallstein et al. |
| 7,791,028 | B2 | | 9/2010 | Baltz et al. |
| 7,832,295 | B2 | | 11/2010 | Rodriguez et al. |
| 7,970,197 | B2 | * | 6/2011 | de la Torre-Bueno ................ |
| | | | | G06V 10/752 |
| | | | | 378/43 |
| 8,500,498 | B2 | * | 8/2013 | Abundis ............ H01R 4/48365 |
| | | | | 439/828 |
| 8,563,876 | B1 | * | 10/2013 | Gretz ................ H01R 13/502 |
| | | | | 174/559 |
| 8,569,705 | B2 | | 10/2013 | Baltz et al. |
| 9,054,446 | B2 | | 6/2015 | O'Sullivan et al. |
| D755,655 | S | | 5/2016 | Scott et al. |
| 9,477,060 | B2 | | 10/2016 | Casals |
| 9,531,180 | B2 | | 12/2016 | Xu et al. |
| D787,962 | S | | 5/2017 | Scott et al. |
| D787,963 | S | | 5/2017 | Scott et al. |
| D787,964 | S | | 5/2017 | Scott et al. |
| 9,647,439 | B1 | * | 5/2017 | Gretz ................ H02G 15/013 |
| 9,689,855 | B2 | | 6/2017 | Scott et al. |
| 9,778,180 | B2 | | 10/2017 | Baltz et al. |
| D803,081 | S | | 11/2017 | Scott et al. |
| 9,835,554 | B2 | | 12/2017 | Scott et al. |
| 9,874,016 | B2 | | 1/2018 | Sorkin |
| 10,302,616 | B2 | | 5/2019 | Scott et al. |
| 10,365,097 | B2 | | 7/2019 | Steinbach et al. |
| 10,393,654 | B2 | | 8/2019 | Baltz et al. |
| 10,429,369 | B2 | | 10/2019 | Mckee |
| 10,591,389 | B2 | | 3/2020 | Trumbo et al. |
| 10,890,526 | B2 | | 1/2021 | Scott et al. |
| 10,908,140 | B2 | | 2/2021 | McKee |
| 10,914,718 | B2 | | 2/2021 | Scott et al. |
| 10,989,657 | B2 | | 4/2021 | Baltz et al. |
| 11,060,956 | B2 | | 7/2021 | Trumbo et al. |
| 11,181,427 | B2 | | 11/2021 | Kimbell et al. |
| 11,349,251 | B2 | | 5/2022 | Ix et al. |
| 11,406,835 | B2 | * | 8/2022 | Iyer ................ H01R 24/58 |
| 11,617,892 | B2 | * | 4/2023 | Iyer ................ A61N 1/3752 |
| | | | | 607/115 |
| 2008/0113554 | A1 | | 5/2008 | Montena |
| 2011/0189876 | A1 | | 8/2011 | Schneider |
| 2017/0117696 | A1 | | 4/2017 | Chiu et al. |
| 2017/0373452 | A1 | | 12/2017 | Diop et al. |
| 2018/0083395 | A1 | | 3/2018 | Watkins |
| 2021/0199577 | A1 | | 7/2021 | Scott et al. |
| 2021/0199636 | A1 | | 7/2021 | McKee |
| 2022/0163406 | A1 | | 5/2022 | Kimbell et al. |

OTHER PUBLICATIONS

European Extended Search Report issued in EP 21761098.9 on Feb. 28, 2024.

* cited by examiner

UNIVERSAL LOAD BEARING CABLE CONNECTOR

CROSS-REFERENCE TO RELATED APPLICATIONS

This application is a U.S. National Stage Application filed under 35 U.S.C. § 371 of International Application No. POT/US2021/019609, filed Feb. 25, 2021, which application claims the benefit of priority to U.S. Provisional Patent Application No. 62/981,388, filed Feb. 25, 2020, which are hereby incorporated by reference in their entirety.

BACKGROUND OF INVENTION

Provided herein are load bearing connector adaptors that can accommodate any of a range of cables in a manner that maintains reliable connection even under an applied load that would otherwise tend to result in the cable slipping out of the adaptor. This provides a number of functional benefits in the field of cable connections and related methods, including for connecting two wires for applications where the wires are immersed in a liquid, including water. Provided herein are adaptors that connect to any of a wide range of cables, including electrical cables that are immersed in water.

Conventional connectors do not reliably connect electrical cables in a manner that can withstand load and that are waterproof. For example, there are no waterproof terminal blocks on the market that are designed to reliably suspend a load.

In view of these limitations, there is a need in the art for reliable universal adaptors that can connect different electrical cables in a manner that can withstand substantial loads that would otherwise tend to result in dislodgement of one or both cables. Provided herein are universal adaptors having a specially configured geometry and arrangement of elements to reliably accommodate loads while maintaining reliable electrical connectivity.

SUMMARY OF THE INVENTION

The problem of reliably connecting cables that may experience a substantial load is addressed herein by use of a specially configured wedge that relies on mechanical advantage to transfer the load of the cable to a sloped or tapered inner wall that defines a wedge cavity in which the wedge is positioned. For water immersion applications where the cable is immersed in or exposed to water, there is a concern of ensuring the system is waterproof, particularly for electrical connections.

The load-bearing adaptors can be used with a waterproof terminal block to electrically and physically connect two stripped cables to each other in a watertight configuration. The wedge systems provided herein grips onto each cable allowing a user to suspend up to 50 lbs (about 23 kg) or more on the "instrument" side of the assembly. One purpose of the adaptors provided herein is to allow a user to easily connect two stripped cables together while supporting the weight of the suspended cable and instrument, including in a watertight configuration. Of course, the adaptors provided herein are compatible with a range of applications, including any application where a cable connection is desired, as the proximal end of the adaptor can be configured to connect to a corresponding connector in the application of interest.

The systems and methods provided herein can advantageously: electrically and mechanically connects two cables; suspend a 501b load; provide a waterproof connection; and provide a wedge lock mechanism that automatically seats the wedges onto the cable seal when the user threads the wedge housing onto the cable seal.

Provided herein are load-bearing universal cable adaptors (10) comprising: a cable seal housing (20) for removably securing an electrical cable (30); a wedge housing (40) having a wedge cavity (50) defined by a tapered inner surface (60) of the wedge housing, wherein the wedge cavity is configured to removably receive at least a portion of the cable seal housing, a wedge (190) having an outer surface (191) in physical contact with the wedge housing tapered inner surface; one or more wedge springs (70) in operable connection with the wedge, wherein the distal end has a smaller dimension (63) than a proximal end dimension (65) at wedge cavity proximal end (64); wherein under an applied load (120) generated by an electrical cable operably connected to the wedge (190), the wedge is configured to transfer the applied load to the wedge housing tapered inner surface. The wedge spring is optionally described as configured to generate a radially-directed force (90) to bias the wedge radially outward and/or an axially-directed force (110) to bias the wedge in an axial direction toward a distal end (62) of the wedge cavity.

Also provided herein is a load-bearing universal cable adaptor comprising: a cable seal housing (20) for removably securing an electrical cable (30); a wedge housing (40) having a wedge cavity (50) defined by a tapered inner surface (60) of the wedge housing, wherein the wedge cavity is configured to removably receive at least a portion of the cable seal housing; a wedge (190) having a plurality of wedge grips (193), each wedge grip having an outer surface (191) in physical contact with the wedge housing tapered inner surface and an inner surface (192) for gripping a cable; and a wedge spring (70) that operably connects the wedge to the cable seal housing (20), wherein the wedge spring is configured to accommodate axial movement of the wedge grips relative to the tapered inner surface (60) and toward a distal end (62) of the wedge cavity, wherein the distal end has a smaller dimension (63) than a proximal end dimension (65) at a wedge cavity proximal end (64).

The cable seal housing (20) may have an inner facing surface (21) and a plurality of grooves (196) in the inner facing surface for receiving a portion of the wedge spring (70). In this manner, under an applied load (120) generated by an electrical cable (30) operably connected to the wedge grip inner surface (192), the wedge is configured to transfer the applied load to the wedge housing tapered inner surface and the wedge spring (70) accommodates axial movement of the wedge toward the distal end (62) of the wedge cavity (50) to increase a gripping force on the cable (30) by the wedge grips (193). The ability to reliably force the wedge, specifically the wedge grips, toward the narrower distal end of the cavity provides a number of important functional benefits related to the attendant forces generated by a cable under load. First, the narrowing of the cavity acts to tightly force the wedge grip inner surfaces (192) tightly against the cable (30) outer surface. This acts to ensure the wedge grips tightly and reliably grip the cable, with the higher the force acting to pull the cable out from the wedge, the more tightly the wedge grips give the cable. This sort of positive feedback loop, of higher cable pulling forces generating a higher grip force, advantageously avoids cable slipping under higher loads. As desired, the wedge grip inner surface (192) may have a pattern of relief and recess features (197) to increase friction between the wedge grip inner surface and cable surface. Second, the contact between the wedge grip outer surface (191) and the tapered inner surface (60) of the wedge cavity (50) transfers load to the wedge housing.

The wedge spring may comprise a spiral length of material positioned around a proximal region of the wedge grips, so as to facilitate axial motion of the wedge grips. The axial motion may be achieved by fixing a portion of the wedge spring relative to the cable seal housing so that the rest of wedge spring accommodates axial movement, thereby moving the wedge grips along an axial direction relative to the tapered inner surface of the wedge housing.

The one or more wedge springs may comprise a radial wedge spring (101) to generate the radially-directed force; and a longitudinal wedge spring (100) to generate the longitudinally-directed force (110) to longitudinally translate the cable seal housing in the wedge cavity. In this embodiment, the radial and wedge springs are physically separate components. Of course, the wedge spring may be a single spiral spring that acts to drive the wedge grips toward the narrow (distal) portion of the wedge cavity, thereby better gripping the cable with the wedge grips inner surface.

The adaptors provided herein, however, can have a type of "integrated" spring systems, wherein the one or more wedge springs comprise an integrated wedge spring (121), wherein the integrated wedge spring generates both the radially-directed force and the longitudinally-directed force. For example, a leaf spring may be configured to provide both the radial-force and the longitudinal force, such as by shaping the geometry so that there is tendency to bias toward the distal end of the wedge housing while being radially-flexible to accommodate both a wedge expanded state to receive a cable (e.g., wedge positioned toward proximal end of the wedge cavity having a larger cavity dimension) and a wedge collapsed state to reliably contact and grip the cable (e.g., wedge positioned toward distal end of the wedge cavity having a smaller cavity dimension to force together the wedge).

The cable seal housing may comprise a central body portion (130) extending from a proximal end (140) to a distal end (150), the central body portion having an inner-facing surface (160) and an outer-facing surface (170). The wedge spring may be an integrated wedge spring comprising a plurality of leaf springs (73) extending from the central body portion distal end and terminating at a cable seal housing distal end (222). For example, there may be two, three, four, five or six wedge springs. The wedge (190) is connected to the leaf spring, the wedge having a wedge inner surface (192) configured to grip an external surface (32) of the electrical cable positioned in and passing through a passage (200) defined by the central body portion inner-facing surface.

The plurality of leaf springs may be uniformly-radially dispersed to form a central passage (210) longitudinally aligned with the central body portion passage (200) for receiving an electrical cable, wherein the plurality of leaf springs is optionally four leaf springs.

The cable seal housing has a proximal end (220). A connector (230) may be positioned at the cable seal proximal end for removably connecting the cable seal distal end to an object (240). The adaptor is compatible with any of a range of objects, depending on the application of interest. For example, the object may selected from the group consisting of: a terminal block; a housing; an instrument, and an electrical enclosure.

The adaptor is compatible with any of a range of connector mechanisms known in the art. For example, the cable seal proximal end connector may comprise threads (250) positioned on an inner (252) or outer surface (254) of the cable seal housing for rotationally mating with a counterpart thread (256) positioned on an external or internal surface of the object, such as a terminal block.

An object that is a terminal block is particularly useful for applications where it is desired to connect and splice together two cables, including in a watertight configuration. The terminal block has a first surface (270) and a second surface (280) with the adaptor further comprising: a first (10*a*) and a second (10*b*) integrated wedge system, wherein the first and second integrated wedge systems each comprise an integrated assembly corresponding to the cable seal housing, the wedge housing, the wedge, and the one or more wedge springs. In this manner, the first integrated wedge system is removably connected to the terminal block first surface, and the second integrated wedge system is removably connected to the terminal block second surface.

A first stripped cable (30*a*) is operably connected to the cable seal housing (40*a*) of the first integrated wedge system (10*a*); and a second stripped cable (30*b*) is operably connected to the cable seal housing (40*b*) of the second integrated wedge system (10*b*). The first and second stripped cables each have a proximal end (33*a* 33*b*) operably connected to the terminal block first and second ends, respectively.

The adaptors provided herein may be configured to withstand at least 50 pounds of load while maintaining an electrical connection between the first and second stripped cables. This is achieved be selecting an appropriate number of wedges and corresponding wedge cavity taper angle.

The adaptor can be watertight, wherein at least one cable is connected to a device (500) for measuring at least one liquid parameter.

In an embodiment, the cable seal housing and the wedge housing are rotationally and removably connected to each other. In an embodiment, any of the adapters that have such a rotational coupling further comprise a slip clutch (300) operably connected to the cable seal housing and the wedge housing to prevent over-tightening of the rotational connection.

Any of the adapters provided herein have a wedge expanded state (400) configured to receive the electrical cable; and a wedge collapsed state (410) configured to reliably grip the electrical cable in a central passage (200 210) and to transmit a load to the wedge housing tapered inner surface. These states can be reliably and readily achieved by using the tapered cavity surface and axially translating the cable seal housing so that wedge correspondingly opens or closes, thereby adjusting the passage diameter defined by the inner-facing surfaces of the wedges. A smaller passage diameter grips the electrical cable, a larger passage diameter allows for a cable to be positioned through the passage and connected to a terminal block, as desired.

Any of the adaptors provided herein are watertight to a depth of up to 1 meter.

The wedge cavity tapered inner surface may be defined by a taper angle of between 1° and 40°.

In a preferred embodiment, the wedge is formed as a physically separate component from the cable seal housing. The wedge comprises a wedge grip base, the wedge spring, and a plurality of axially-movable wedge grips extending from the wedge grip base. The wedge spring is positioned adjacent to the wedge grip base and over a proximal region of the plurality of axially-movable wedge grips. In this manner, the wedge springs facilitate axial movement of the wedge grips, such as by the cable seal housing comprising a plurality of grooves positioned in a cable seal housing inner facing surface. The grooves receive a portion of the wedge spring, such as the top tails of the wedge spring (proximal-most portion of the wedge spring), to thereby connect the wedge to cable seal housing. The wedge spring portion in the grooves is configured to provide axial movement of the plurality of axially-movable wedge grips relative to the cable seal housing and, more importantly, relative to the tapered inner surface of the wedge cavity, while retaining at least a portion of the wedge spring in the cable seal housing. When the adaptor is fully assembled, such as cable installed and wedge housing threaded onto the cable seal housing, the wedge grips grip onto the cable, and the weight of the cable/instrument act to pull the wedge grips axially toward the wedge housing. This axial movement effectively wedges the wedge grips further into the wedge housing cavity (e.g., toward the distal cavity narrowing)

The wedge spring preferably is connected to a plurality of axially-movable wedge grips extending from a wedge grip base, and the wedge grip base connects to the cable seal housing. In this manner, the wedge grips (and wedge spring) are a separate component from the cable seal housing. The wedge is, of course, compatible with other connections that provide axial motion relative to the cable seal housing, such as a press-fit connection or clamp connection.

As desired, thread pitch on any of the threaded connections is selected to provide a desired range of motion during rotation, including to facilitate easier and quicker installation, where fewer rotation movements are required for installation as thread pitch increases.

Also provided herein are various methods of making or using any of the adaptors provided herein. For example, provided herein are methods of connecting, electrically and physically, two cables to each other.

A method may be to first mechanically connect a cable to any of the adaptors described herein, such as by the steps of: inserting the electrical cable through the cable seal housing and the wedge housing; positioning a portion of the cable seal housing in the wedge cavity of the wedge housing; connecting the cable seal housing and the wedge housing, wherein upon the connection, the cable seal housing reliably grips the electrical cable. The connection may be by a rotational connection between threaded components, a snap-fit or a friction fit of mechanically matched components. In this manner, a cable such as an electrical cable is mechanically connected to the adaptor.

Such an adaptor configuration may then be used to electrically connect to a second electrical cable, such as through a terminal block. In this aspect, the step of mechanically and electrically connecting the electrical cable that is a first electrical cable to a second electrical cable may be by: connecting a terminal block to the cable seal housing and electrically connecting a distal end of the first electrical cable to the terminal block; providing a second adaptor; and repeating previous steps from the first wire connection to the adaptor to mechanically connect the second electrical cable to the second universal cable adaptor; and connecting the terminal block to the cable seal housing of the second universal cable adaptor to mechanically connect the electrical cable to the universal cable adaptor.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

BRIEF DESCRIPTION OF THE DRAWINGS

FIG. 3A is a side view and FIG. 3B is a cross-sectional view of FIG. 3A.

FIG. 8A illustrates the housings unthreaded from the terminal block. FIG. 8B illustrates a cable inserted though the housings and the wedge. FIG. 8C illustrates the cable seal housing threaded onto the terminal block. FIG. 8D illustrates the adaptor connected, with the wedge in an expanded state (e.g., wedge is proximally positioned in a longitudinal direction in the wedge cavity). FIG. 8E illustrates the wedge in a collapsed state (e.g., wedge is distally positioned in a longitudinal direction in the wedge cavity) with the wedge reliably gripping an outer surface of the cable.

FIG. 13A is a side view and FIG. 13B is a cross-sectional view of FIG. 13A.

DETAILED DESCRIPTION OF THE INVENTION

In general, the terms and phrases used herein have their art-recognized meaning, which can be found by reference to standard texts, journal references and contexts known to those skilled in the art. The following definitions are provided to clarify their specific use in the context of the invention.

"Load-bearing" refers to the adaptor with a cable inserted therein being able to withstand a load without dislodgment of the cable from the cable housing. This is achieved herein by the special configuration of the wedge in the wedge cavity that has a spatially narrowing dimension such that the greater the load on the cable, the greater the load is transmitted to the wedge housing.

"Universal" refers to the adaptor that is compatible with any cable size. This is accomplished by tailoring the size and configuration of the system to the cable, with larger cables having a corresponding larger passage diameter.

"Radial wedge spring" refers to a spring that generates a spring force in the radial direction relative to a cable longitudinal axis. "Longitudinal wedge spring" refers to a spring that generates a spring force in the axial direction, or the direction that the cable runs (e.g., the cable longitudinal axis).

"Integrated wedge spring" refers to a spring that can generate both the radial and longitudinal forces.

Unless defined otherwise, "substantially" refers to a value that is within at least 20%, within at least 10%, or within at least 5% of a desired or true value. Substantially, accordingly, includes a value that matches a desired value.

"Operably connected" or "in operable connection" refers to a configuration of elements, wherein an action or reaction of one element affects another element, but in a manner that preserves each element's functionality. For example, a wedge spring in operable connection with the wedge refers to the ability of the springs to radially and longitudinally position the wedge without impacting the functionality of the wedge to grip a cable and transmit forces to the walls of the wedge housing from the cable.

"Releasably connected" or "releasably connects" refers to a configuration of elements, wherein the elements can be temporarily and reliably connected to each other and, as desired, removed from each other without adversely impacting the functionality of other elements of the device. For example, a releasably connected configuration includes a threaded connection where rotation of one element relative to another element connects or disconnects the components. Similarly, two elements that snap-fit connect or friction fit to each other are similarly considered to be releasably connected to each other.

Example 1: Load-Bearing Universal Cable Adaptor

Figure 1A:
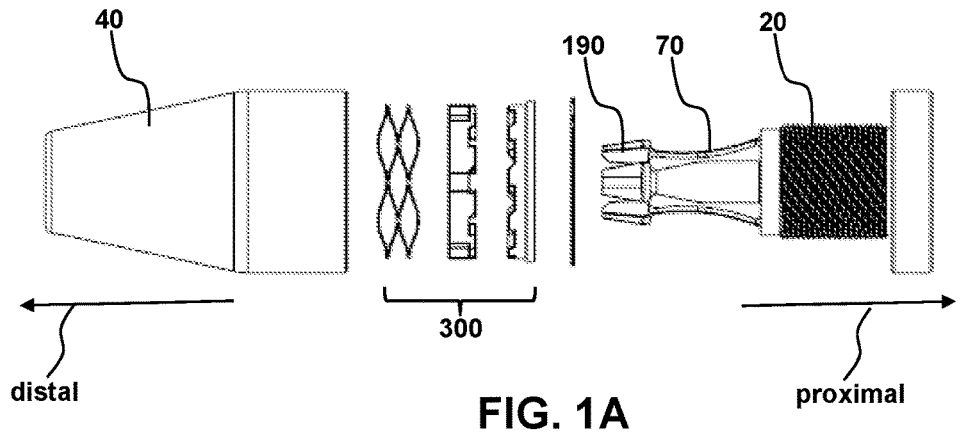
FIG. 1A is a side view of a cable seal housing and wedge housing and a slip clutch in a disassembled state.
Figure 1B:
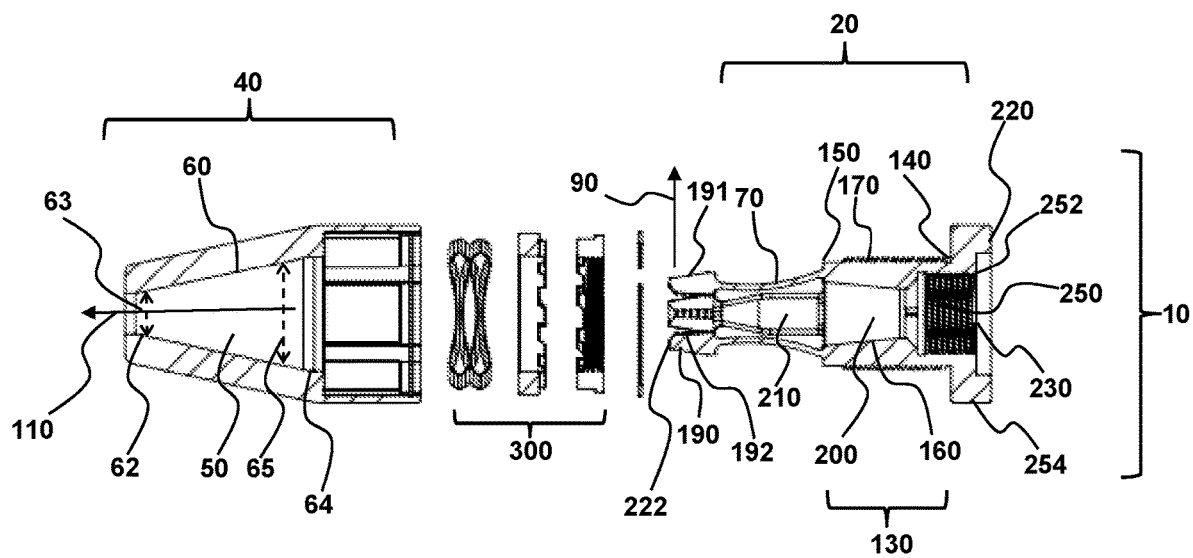
FIG. 1B is a cross-section through a center plane of FIG. 1A to illustrate various internal elements.
Figure 11:
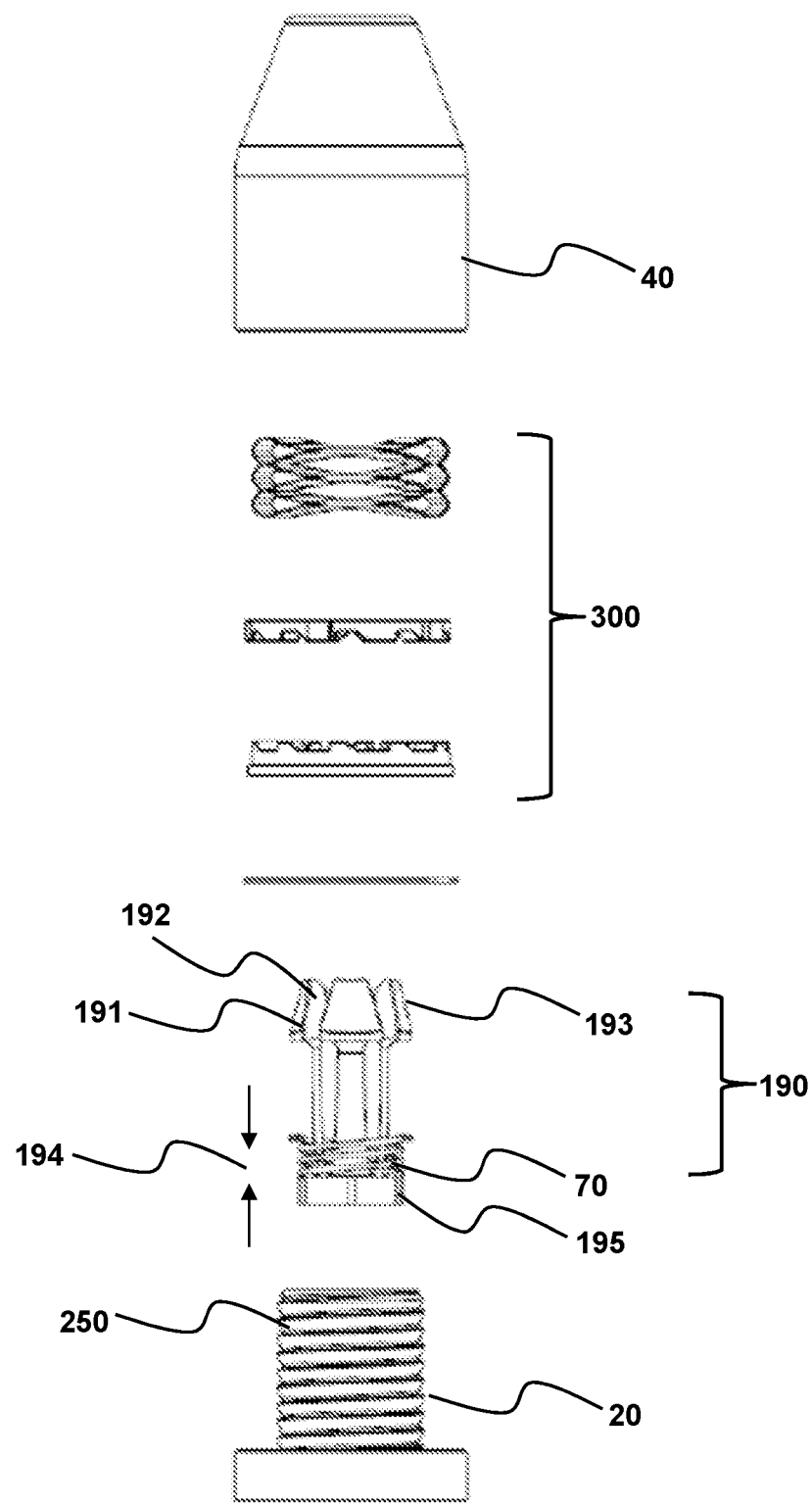
FIG. 11 is a side view of a cable seal housing and wedge housing and a slip clutch in a disassembled state.
Figure 12A:
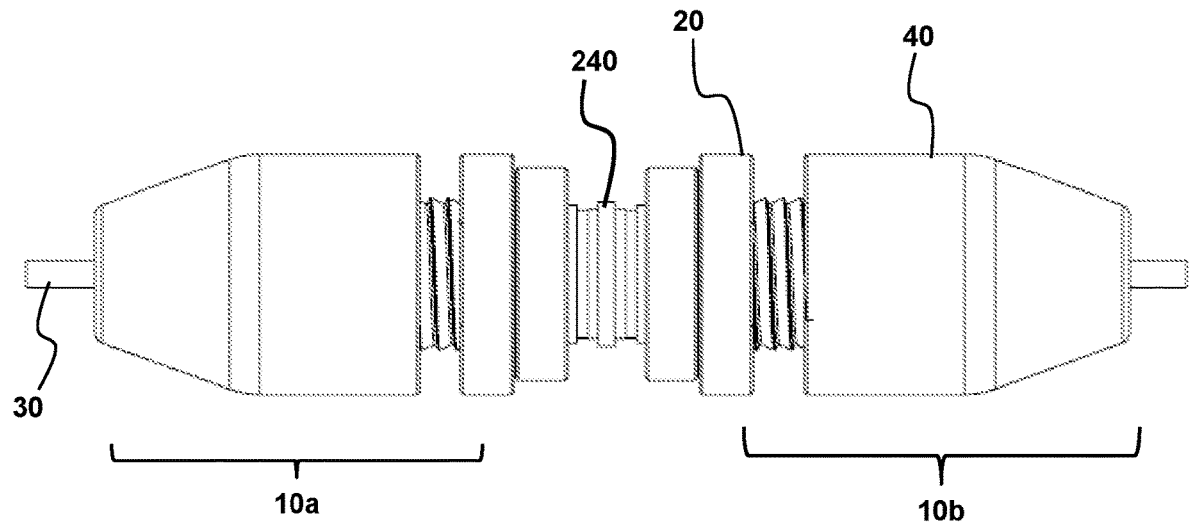
FIG. 12A illustrates a pair of integrated wedge systems of FIG. 11, each connected to a terminal block in a configuration useful for connecting two cables.
Figure 12B:
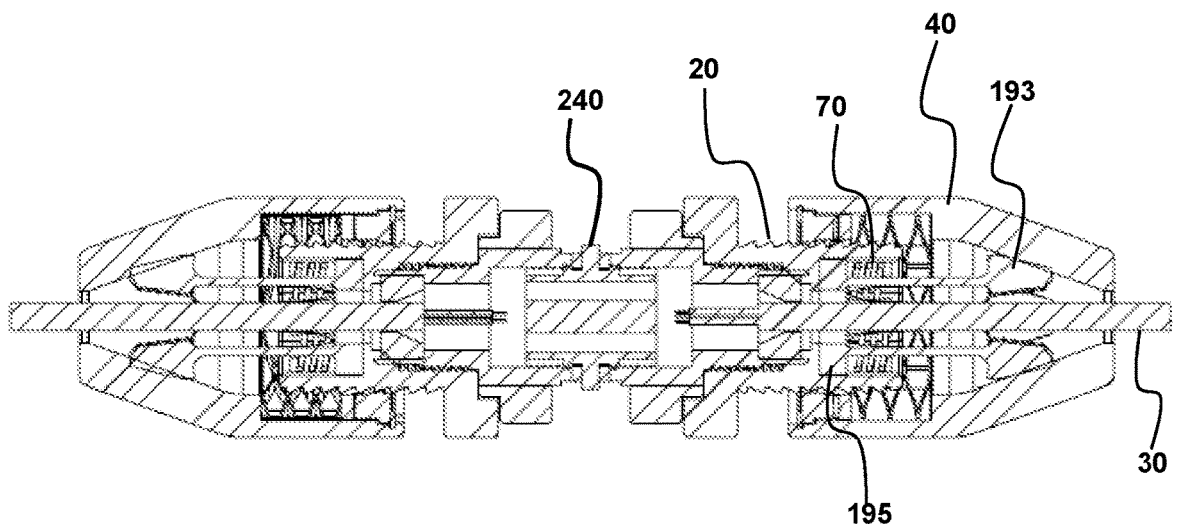
FIG. 12B is a cross-sectional view of FIG. 12A.

Various configurations of a load-bearing universal cable adaptor 10 is provided in FIGS. 1A-1B and FIG. 11. The arrows in FIG. 1A provide the general orientation of "proximal" and "distal", with distal generally in a direction away from a "stripped" portion of the cable toward a separate device to which the cable connects (e.g., to the left-side of the page). In a most general configuration, a cable seal housing 20 has a wedge spring 70 and wedge 190. The cable seal housing is configured to removably connect or secure an electrical cable 30 (see, e.g., FIG. 3A). Cable seal housing is configured to connect to wedge housing 40, with the wedge 190 positioned in wedge cavity 50 formed by a tapered inner surface 60 of wedge housing 40. Tapered inner surface 60 refers to characteristic dimension, such as a diameter for a circular cross-section wedge cavity geometry that goes from a maximum dimension 65 at proximal end 64 toward a minimum dimension 62 at a distal end 63.

Figure 3A:
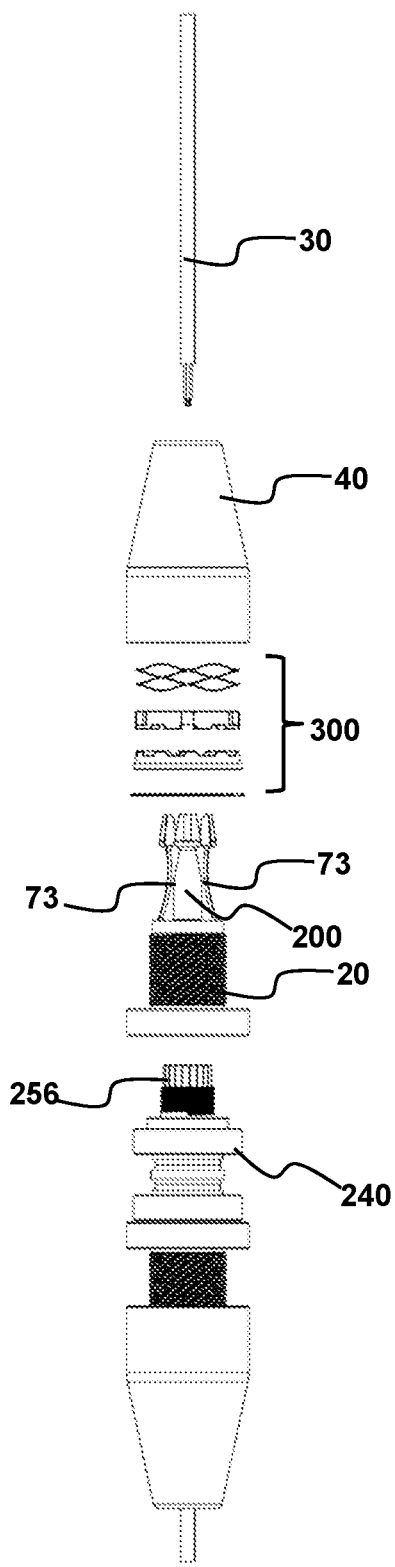
FIGS. 3A-3B are schematic illustrations of an assembled adaptor connected to an object (lower portion) and another adaptor that is disassembled (upper portion) to illustrate the various components.
Figure 5:
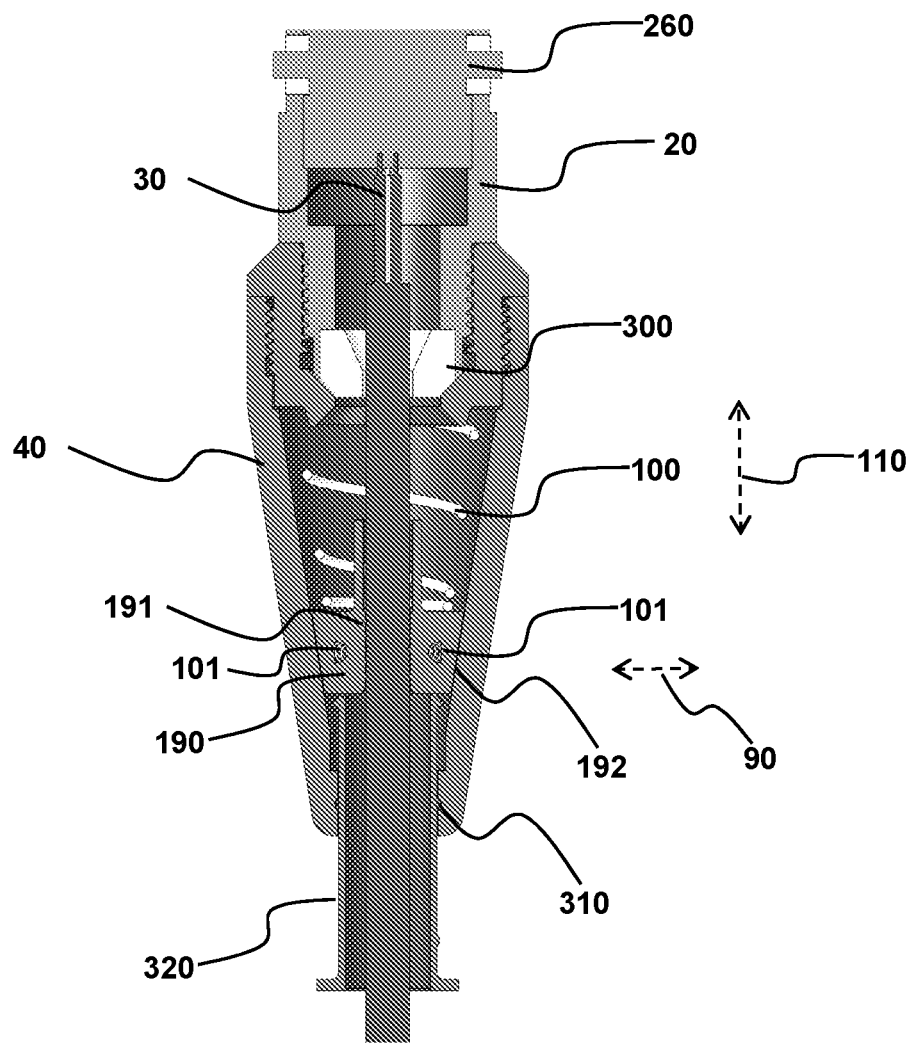
FIG. 5 is a cross-sectional side view of another adaptor embodiment.

Wedge spring 70 can be a leaf spring 73 (see, e.g., FIG. 3A). A wedge spring is configured to generate a radially-directed force 90 to ensure wedge contacts the wedge cavity tapered inner surface 60. A wedge spring is configured to generate an axially-directed force 110. The axially and radially generated forces may be generated by an integrated wedge spring 121, such as a leaf spring 73, or may comprise physically distinct springs (100 101), including as illustrated in Example 3 and, for example, FIG. 5.

Figure 2A:
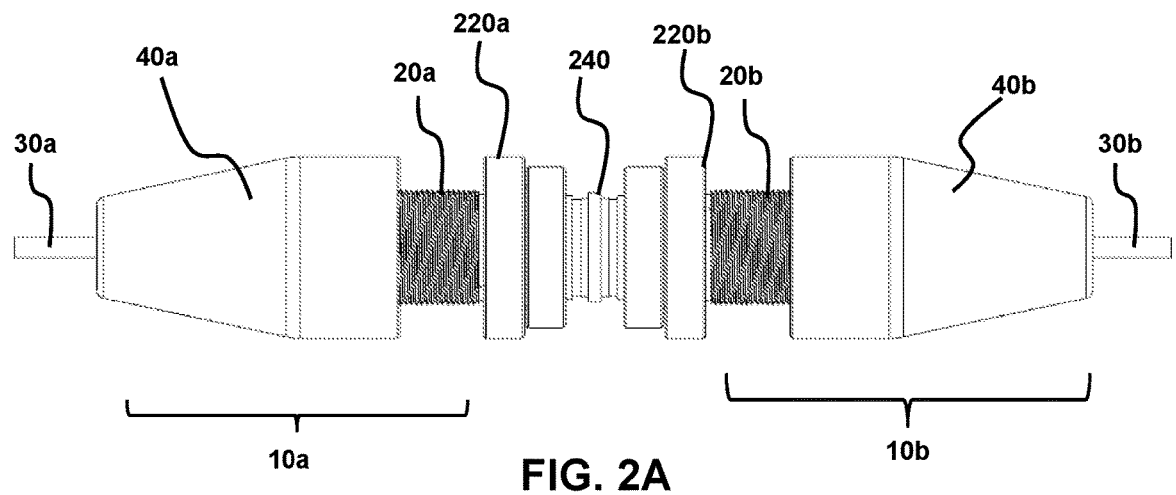
FIG. 2A illustrates a pair of integrated wedge systems of FIGS. 1A-1B each connected to a terminal block in a configuration useful for connecting two cables.
Figure 2B:
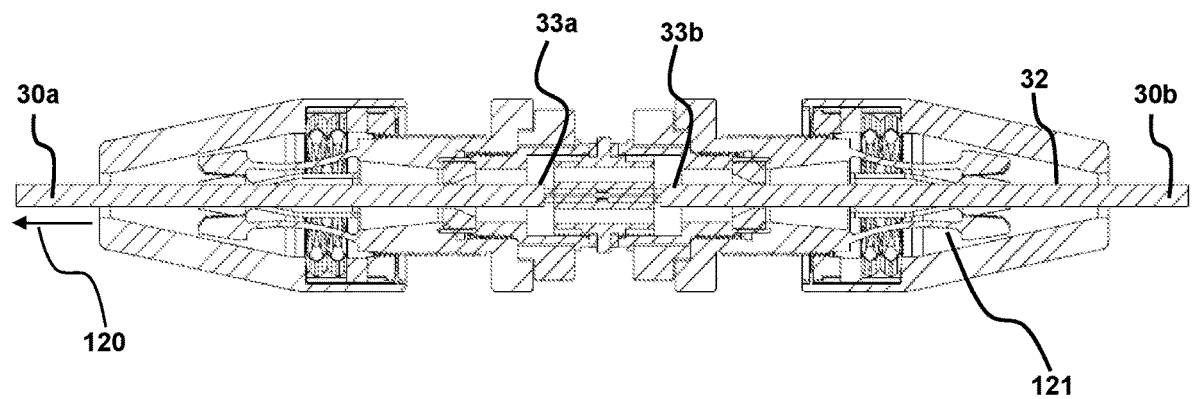
FIG. 2B is a cross-sectional view of FIG. 2A.

Under an applied load 120 (FIG. 2B) generated by a cable 30 (including a first cable 30a and/or a second cable 30b), the wedge 190 generates a force onto the wedge housing 40 while maintaining a grip on the cable 30. In this manner, the applied load that would otherwise act to pull a cable out of the wedge is at least partially transferred to the wedge housing tapered inner surface 60.

A central body portion 130 of cable seal housing 20 having a proximal end 140 and a distal end 150 forms a passage 200 defined by inner-facing surface 160 through which a cable 30 can pass. Outer-facing surface 170 is separated from the inner-facing surface 160 by a thickness. In an embodiment, the thickness is spatially-varying that tapers toward distal end 150.

Wedge 190 has an outer surface 191 configured to contact tapered inner surface 60 of the wedge cavity 50 within wedge housing 40. Wedge inner surface 192 defines a central passage 210 though which a cable 30 can pass.

Cable seal housing 20 is defined by proximal 220 and distal 222 ends. Proximal end 220 may be configured to connect to another object, such as an enclosure where an electrical connection is desired or to another adaptor, as explained in Example 2.

As desired, an O-ring, rubber gasket, or the like may be used to provide water resistance and avoid unwanted leakage between components.

FIG. 11 shows a preferable embodiment wherein there is an increased thread pitch on the wedge housing 40 that connects to threads 250 on the surface of cable seal housing 20. In addition, wedge 190 with wedge spring 70 and wedge grips 193 in a separable component from cable seal housing 20. Wedge spring 70 is positioned adjacent wo wedge grip base 195 and surrounding proximal region 194 of the plurality of axially-movable wedge grips 193. This provides an improved gripping force by wedge grips 193 onto a cable 30, including as illustrated in FIGS. 12A-14B. Accordingly, wedge 70 may have a plurality of wedge grips 193 that together have a gripping face that forcibly contacts a cable 30 on inner surface 192 to provide a robust and reliable gripping force. The wedge grips may number two, three, four or more individual wedge grips 193. Wedge spring 70 is positioned adjacent to wedge grip base 195, as indicated by proximal region 194. There is tolerance to size of proximal region, including to accommodate various sizes/lengths of wedge spring 70.

Figure 15:
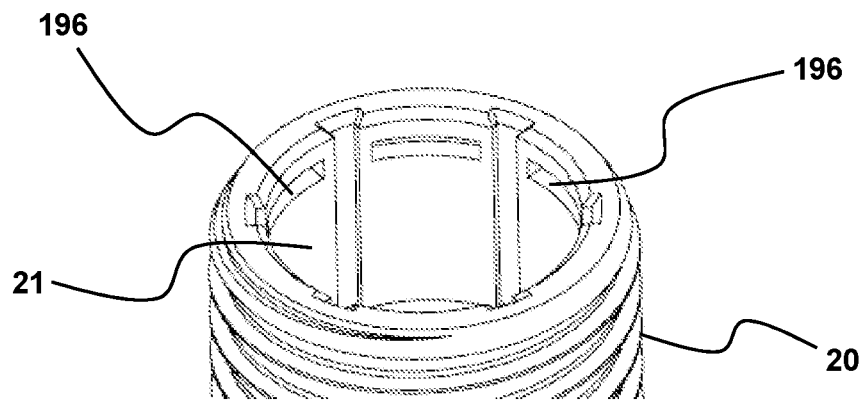
FIG. 15 is a close up view of the cable seal housing, including inner facing surface with grooves configured to receive and retain a portion of a wedge spring.
Figure 16:
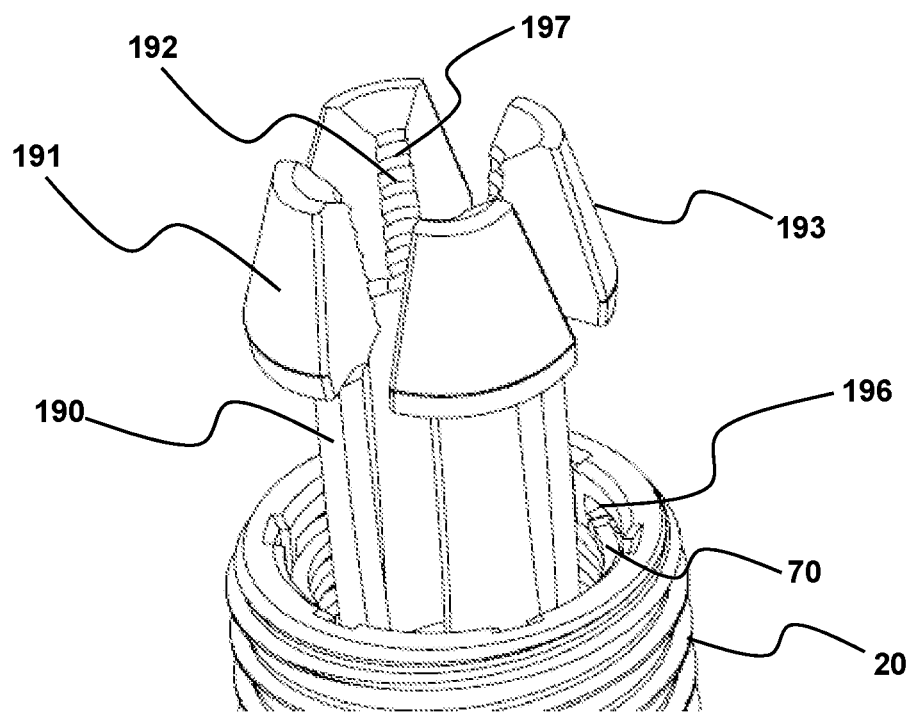
FIG. 16 illustrates the cable seal housing of FIG. 15 with a retained wedge. The wedge spring portion in the cable seal housing groove allows for axial motion of the wedge grips relative to the cable seal housing, thereby ensuring tight grip of any cable gripped by the wedge grips that wedge toward wedge housing cavity distal end.

FIG. 15 is a close-up view of the cable seal housing 20 with inner surface 21 having a plurality of grooves 196 configured to receive and retain a portion of wedge spring 70. FIG. 16 illustrates wedge 190 connected to cable seal housing 196, with a portion of wedge spring 70, such as the top tails of the wedge spring, inserted into the grooves 196. The axially movable wedge grips 193 have wedge inner surface 192 to contact and grip a cable as the wedge outer surface 191 is forced inward by contact with the tapered inner surface of the wedge cavity. In this manner, where only a portion of wedge spring is positioned in the groove, the rest of the wedge spring is able to axially move relative of the cable seal housing 20. Accordingly, a fully assembled adaptor with cable, the wedge grips the cable, and the weight of the cable and attendant instrument acts to effectively pull the wedge grip axially toward the cavity taper. This results in an inward-directed radial force to further increase the grip of the wedge grips 193 against cable 30, providing an even tighter grip on the cable (as well as transmitting load to the wedge housing 40. This provides the functional benefit of ensuring the cable does not slip through the wedge grips. The wedge grip inner surface 192 may have a pattern of recess and relief features 197 to improve grip with a cable 30, such as by increasing friction between the gripper inner surface 192 and an outer surface of the cable 30. Exemplified are recess and relief features formed from a plurality of grooves aligned in a direction perpendicular to the cable longitudinal alignment direction.

Example 2: Serially Connecting Two Adaptors

Figures 13A, 13B:
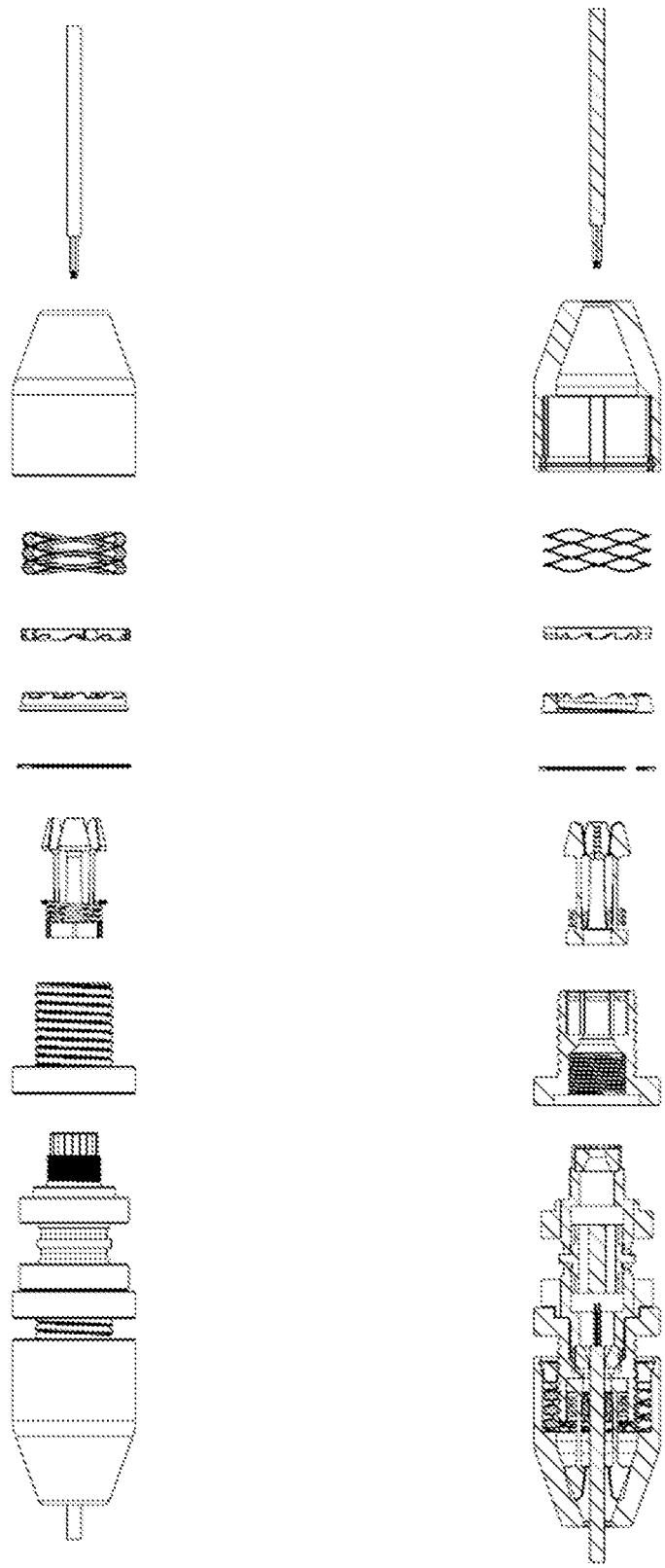
FIGS. 13A-13B are schematic illustrations of an assembled adaptor of FIG. 11 connected to an object (lower portion) and another adaptor that is disassembled (upper portion) to illustrate the various components.
Figure 14A:
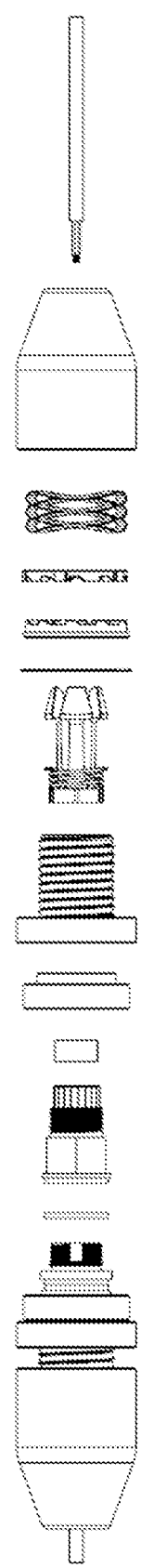
FIGS. 14A-14B are views of FIGS. 13A-13B, respectively, but with the central terminal block partially disassembled configuration.
Figure 14B:
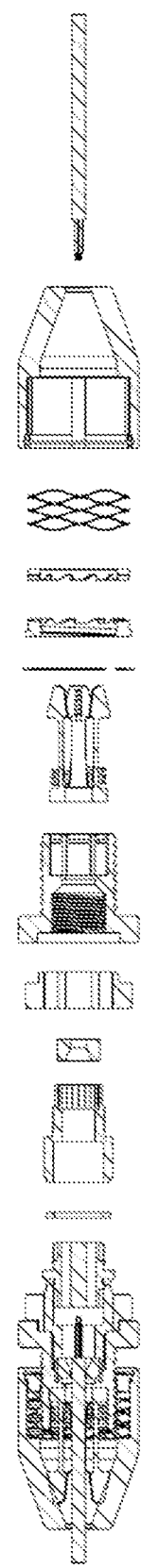

The load-bearing universal cable adaptor of FIGS. 1A-1B (see also, for example, FIG. 5) and 11 may be used in combination with a second adaptor to mechanically and electrically connect distinct electrical cables, including as illustrated in FIGS. 2A, 2B, 6A, 6B, 9, 12A, 12B To facilitate such connections, the proximal end 220 of cable seal housing can be configured to reversibly connect to an object 240, such as a terminal block 260. One example of such a connection includes threads 250 positioned on an inner (252) or outer surface (254) of the cable seal housing to rotationally connect to counterpart threads 256 on or in an object (FIG. 3A, 13A). FIGS. 3A-3B and 13A-13B illustrate an adaptor toward the bottom of the page connected to object 240 with a second adaptor having component parts disassembled for clarity along with a cable 30 to-be-inserted though the wedge housing 40 and cable seal housing 20 components, toward object 240.

Figure 3B:
Figure 4A:
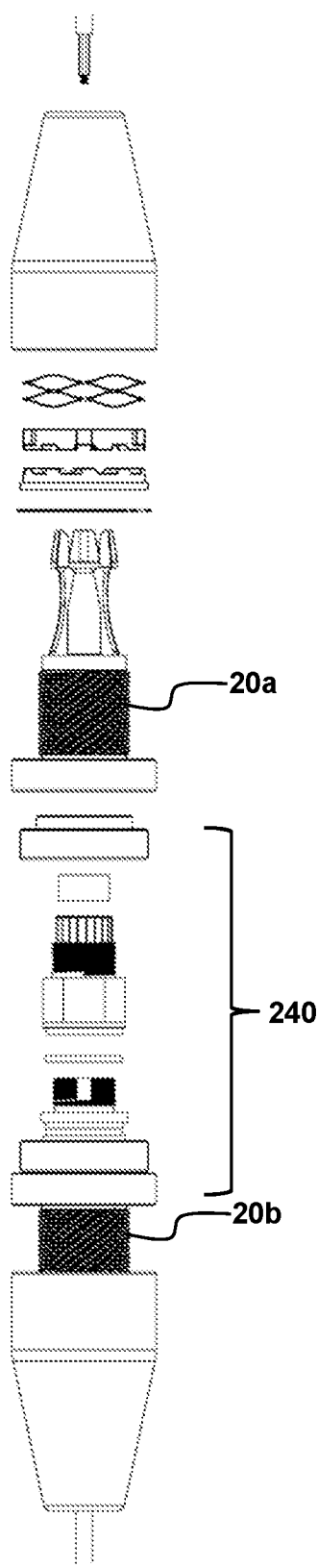
FIGS. 4A-4B are views of FIGS. 3A-3B, respectively, but with the central terminal block partially disassembled configuration.
Figure 4B:
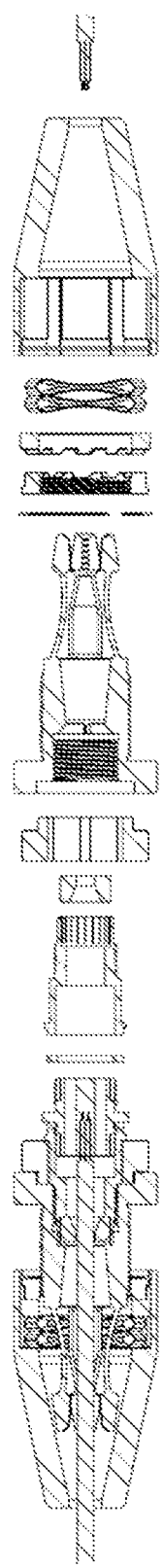

FIGS. 4A-4B (14A-14B) are similar to FIGS. 3A-3B (13A-13B), but with the object 240 disassembled at one side toward first cable seal housing 20a and, at the other side, connected to second cable seal housing 20b.

To minimize risk of damage to the wedge system from over-tightening of rotational components, a slip-clutch 300 may be utilized between the components being tightened.

Example 3: Separate Radial and Longitudinal Springs

Another example of an adaptor is provided in FIGS. 5-8E. In this embodiment, separate longitudinal 100 and radial 101 wedge springs that provide radially-directed 90 and axially-directed 110 forces to reliably position the wedge 190. A stripped cable 30 is connected to a terminal block 260. In this embodiment, also provided is a locking groove 310 and a wedge pusher 320 for positioning the wedge in an open-state configuration.

Figure 6A:
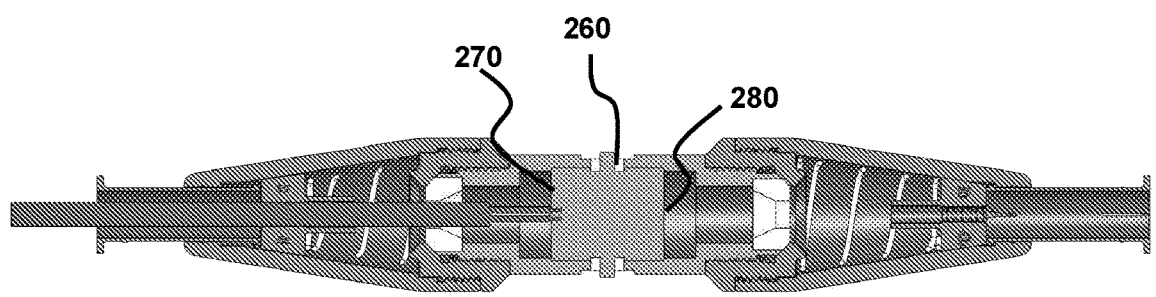
FIG. 6A is a cross-sectional side view of a pair of adaptors of FIG. 5 connected to each other via a terminal block.
Figure 6B:
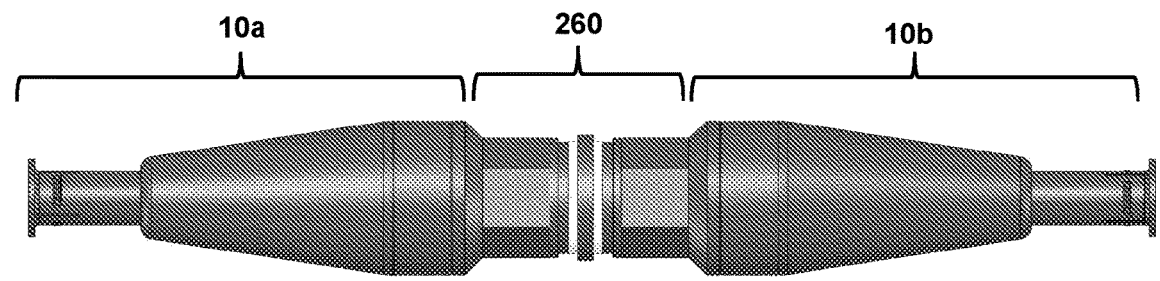
FIG. 6B is a side perspective view of the outer surfaces of FIG. 6A.
Figure 7A:
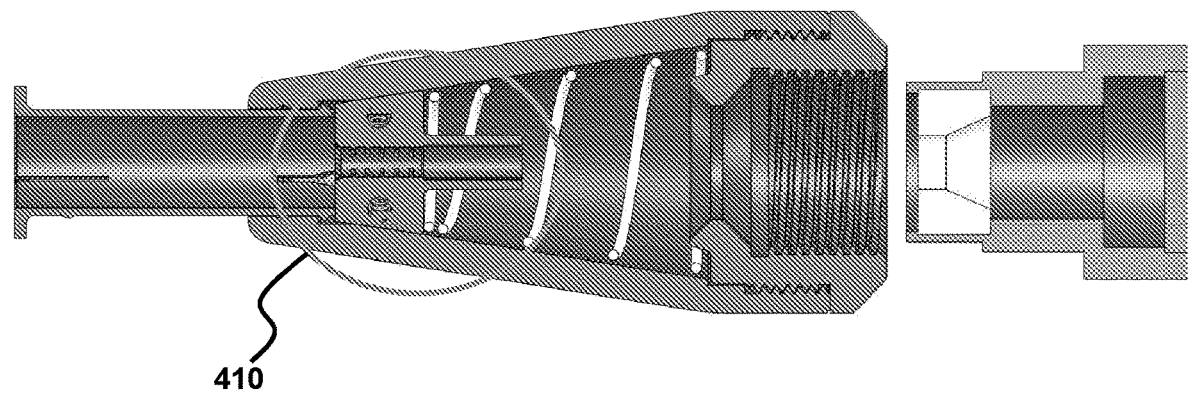
FIG. 7A illustrates the wedge in a collapsed state for gripping an electrical cable.
Figure 7B:
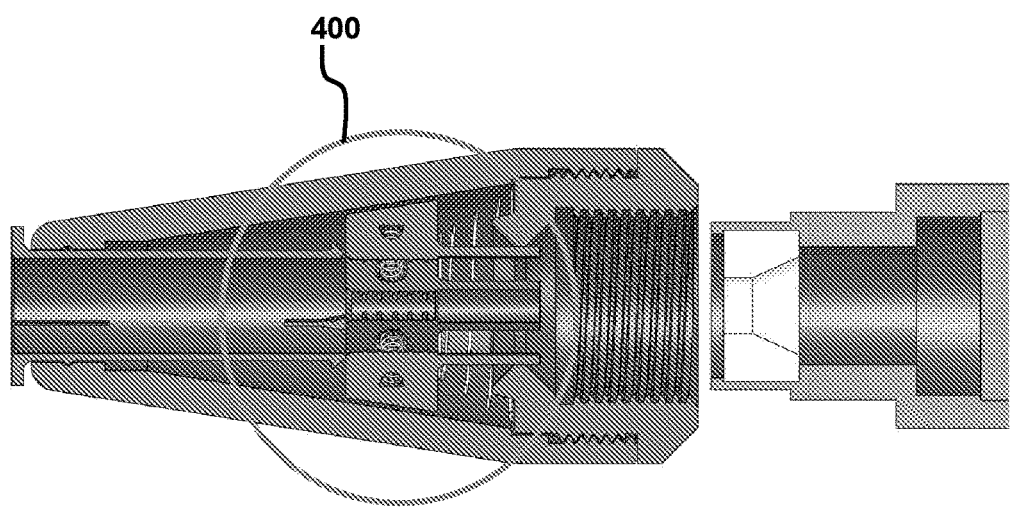
FIG. 7B illustrates the wedge in an expanded state, with a passage in the wedge open and sufficiently sized to receive the cable.

FIGS. 6A-6B is a side view of an assembly having two integrated systems 10a and 10b each connected to a terminal block 260. FIGS. 7A-7B illustrate a wedge in a collapsed state 410 and an expanded state 400.

Example 4: Assembly for Connecting Two Cables

Figure 8A:
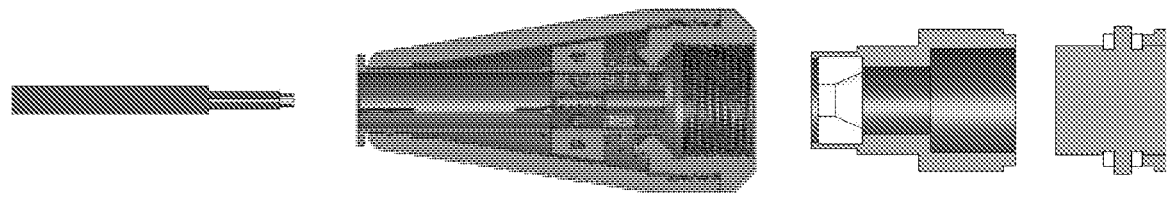
FIGS. 8A-8E summarize assembly steps.
Figure 8B:
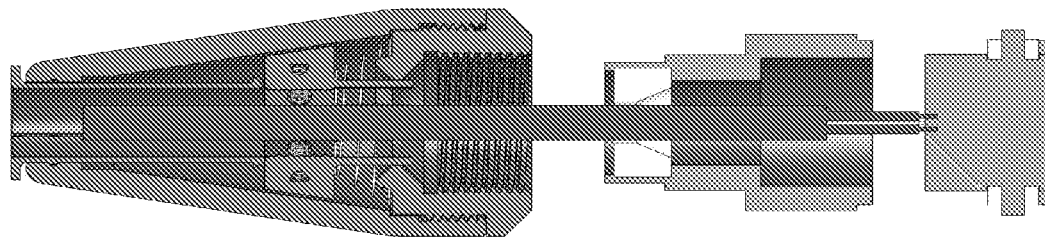
Figure 8C:
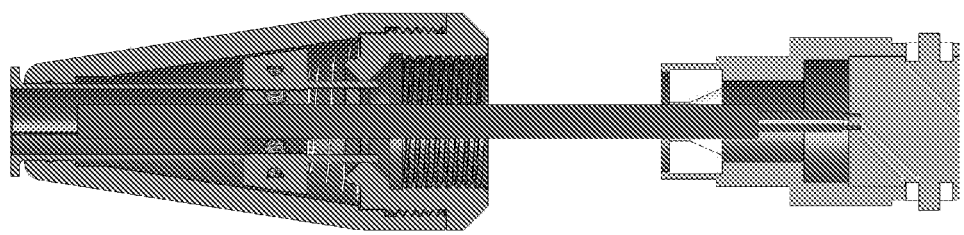
Figure 8D:
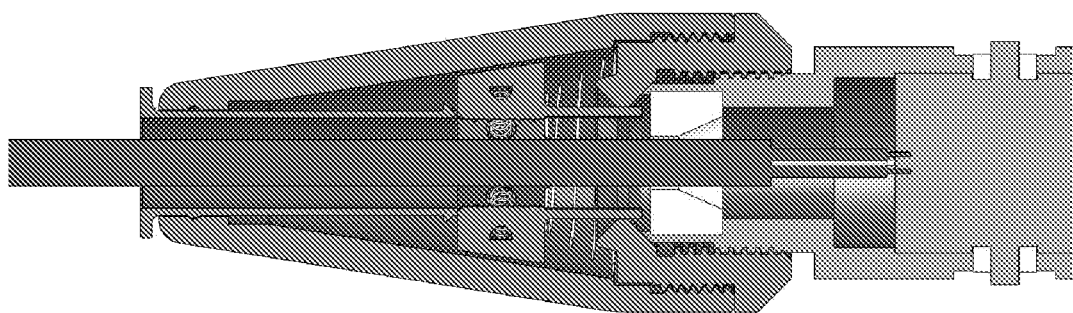
Figure 8E:
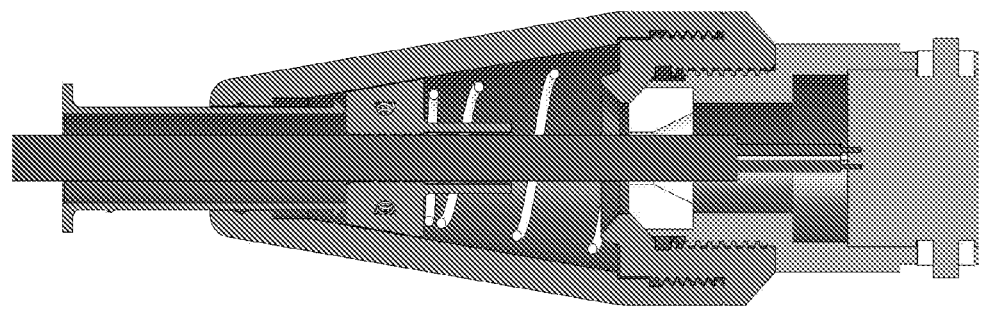
Figure 9:
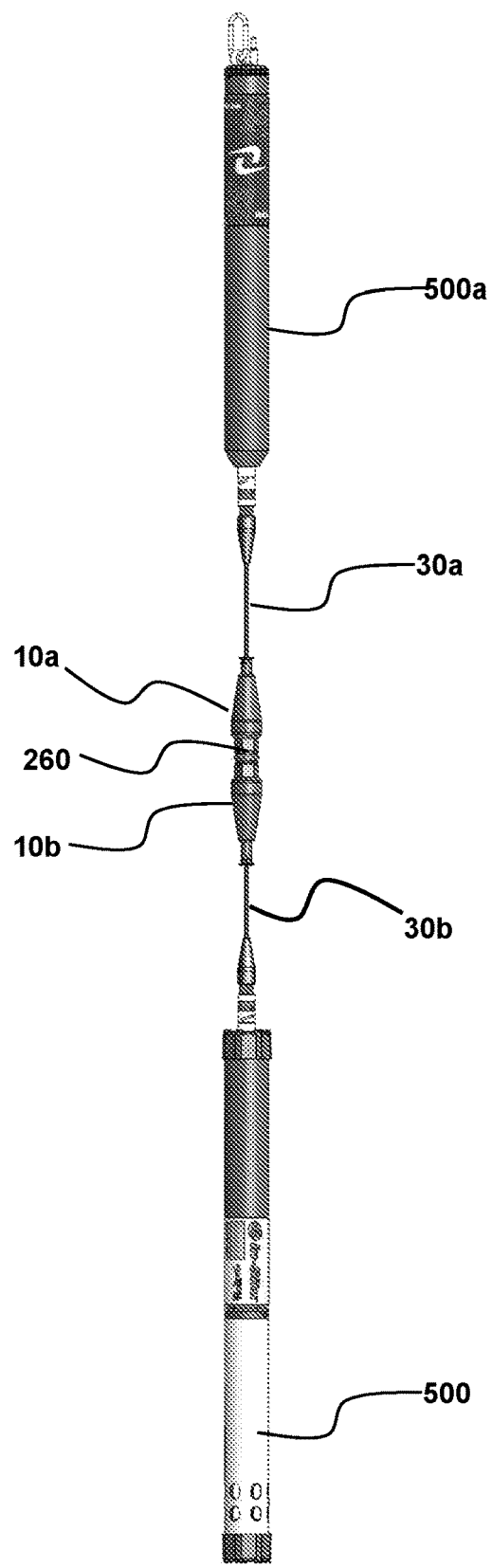
FIG. 9 is an exemplary assembly with the universal adaptor connecting two distinct electrical components.

FIGS. 8A-8E illustrate assembly steps for connecting two cables using two of the adaptors described herein and a terminal block. In FIG. 8A the wedge housing and cable seal are disconnected from the terminal block. In FIG. 8B a cable is inserted through the wedge housing and cable seal, and the cable wires are connected to the terminal block. In FIG. 8C the cable seal housing is connected to the terminal block, such as by threads. In FIG. 8D the wedge housing is threaded onto the cable seal. When the wedge fingers contact the cable seal, the wedge pusher lock is disengaged, and the wedges are seated onto the cable. FIG. 8E illustrates the wedges seated onto the cable. Similar steps are used to connect the wedge assembly of FIG. 1A, in a more refined and simple manner, including without a need for a wedge pusher or other components.

Figure 10:
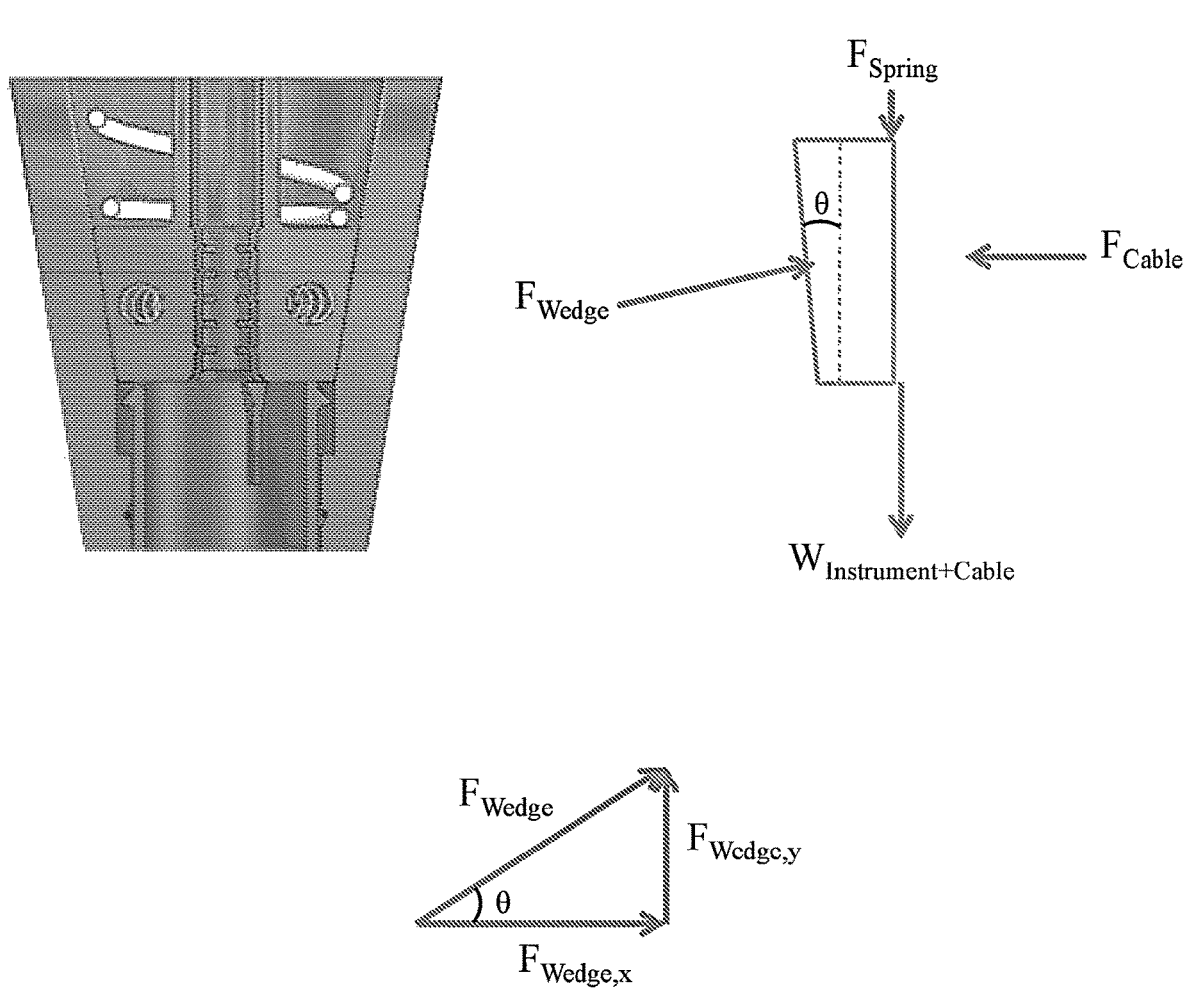
FIG. 10 illustrates the wedge principle using corresponding force vectors and corresponding force balances.

FIG. 10 is the statics force balance of a wedge system, including as illustrated in the top-left panel.

$$\tan(\theta) = \frac{F_{Wedge,y}}{F_{Wedge,x}}$$

$$F_{Wedge,x} = F_{Cable}$$

$$\theta = 9°, F_{Wedge,x} = 17 \text{ lb}$$

$$\tan(9°) = \frac{17 \text{ lb}}{F_{Wedge,x}} \rightarrow F_{Wedge,x} = 107.3 \text{ lb}$$

$$F_{Cable} = 107.3 \text{ lb}$$

$F_{cable}$ is the force on the cable due to one wedge. Utilizing multiple wedges, provides a systems that can withstand even higher forces. For example, for three wedges the total force is 321.9 lb.

Example 5: Illustrative Application

The adaptors provided herein have a range of uses and applications. For example, referring to FIG. 9, in a fully assembled configuration a pair of adaptors 10a and 10b connect to a terminal block 260 (or more generally, object 240), thereby electrically connecting cables 30a and 30b and corresponding water parameter sensor 500. Depending on the application of interest, length of cable 30b may be extremely long, such as for down-hole water sensing. The weight of such a long cable can be substantial. Systems provided herein, however, reliably connect the cable to a terminal block in a manner that can withstand the load generated by the cable 30b and any instruments 500, while maintaining electrical connectivity to another device 500a in a watertight configuration.

Representative instruments that may be used with the adaptors described herein include, but are not limited to, any of those described in U.S. Pat. Nos. 5,337,601, 5,596,193, 5,719,393, 6,157,029, 6,677,861, 6,305,944, 6,928,864, 6,938,506, 7,138,926, 7,007,541, 6,798,347, 7,832,295, 7,791,028, 8,569,705, 10,365,097, 9,689,855, 10,302,616, 10,429,369, D755655, D787964, D787962, D787963, D803081, 9,835,554, 9,778,180, and 10,393,654.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

When a group of substituents is disclosed herein, it is understood that all individual members of that group and all subgroups, are disclosed separately. When a Markush group or other grouping is used herein, all individual members of the group and all combinations and subcombinations possible of the group are intended to be individually included in the disclosure.

Every combination of elements described or exemplified herein can be used to practice the invention, unless otherwise stated.

Whenever a range is given in the specification, for example, a size range, an angle range, a force range, or a number range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that materials and methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

Element List:

| Element No. | Element Description |
|---|---|
| 10 | Load-bearing universal cable adaptor ("connector") |
| 10a | First integrated wedge system |
| 10b | Second integrated wedge system |
| 20 | Cable seal housing |
| 21 | Inner facing surface (of cable seal housing) |
| 30 | Electrical cable |
| 32 | Electrical cable external surface |
| 33a | First electrical cable stripped cable proximal end |
| 33b | Second electrical cable stripped cable proximal end |
| 40 | Wedge housing |
| 50 | Wedge cavity |
| 60 | Tapered inner surface (of wedge cavity) |
| 62 | Distal end (of wedge cavity tapered inner surface) |
| 63 | Dimension of distal end (of tapered inner surface) |
| 64 | Proximal end (of wedge cavity tapered inner surface) |
| 65 | Dimension of proximal end (of tapered inner surface) |
| 70 | Wedge spring |
| 73 | Leaf spring |
| 90 | Radially-directed force (generated by a wedge spring) |
| 100 | Longitudinal wedge spring |
| 101 | Radial wedge spring |
| 110 | Axially-directed force (generated by an axial spring) |
| 120 | Applied load |
| 121 | Integrated wedge spring |
| 130 | Central body portion (of cable seal housing) |
| 140 | Proximal end (of central body portion) |
| 150 | Distal end (of central body portion) |
| 160 | Inner-facing surface (of central body portion) |
| 170 | Outer-facing surface (of central body portion) |
| 190 | Wedge |
| 191 | Wedge outer surface |
| 192 | Wedge inner surface |
| 193 | Wedge grips |
| 194 | Proximal region of the plurality of axially-movable wedge grips |
| 195 | Wedge grip base |
| 196 | Grooves (in inner surface of cable seal housing) |
| 197 | Pattern of relief and recess features (on wedge grip inner surface) |
| 200 | Passage (in central body of cable seal housing) |
| 210 | Central passage (in wedge spring, including in leaf springs) |
| 220 | Proximal end of cable seal housing |
| 222 | Distal end of cable seal housing |
| 230 | Connector |
| 240 | Object |
| 250 | Threads (at cable seal proximal end) |
| 252 | Inner surface (of cable seal proximal end) |

-continued

| Element No. | Element Description |
|---|---|
| 254 | Outer surface (of cable seal proximal end) |
| 256 | Counterpart thread (on object) |
| 260 | Terminal block |
| 270 | Terminal block first surface |
| 280 | Terminal block second surface |
| 300 | Slip clutch |
| 310 | Locking groove |
| 320 | Wedge pusher |
| 400 | Wedge expanded state |
| 410 | Wedge collapsed state |
| 500 | Device connected to distal end of cable (e.g., liquid parameter measuring device) |

We claim:

1. A load-bearing universal cable adaptor comprising:
a cable seal housing for removably securing an electrical cable;
a wedge housing having a wedge cavity defined by a tapered inner surface of the wedge housing, wherein the wedge cavity is configured to removably receive at least a portion of the cable seal housing;
a wedge having an outer surface in physical contact with the wedge housing tapered inner surface;
one or more wedge springs in operable connection with the wedge, wherein the one or more wedge springs are configured to generate an axially-directed force to bias the wedge in an axial direction toward a distal end of the wedge cavity, wherein the distal end has a smaller dimension than a proximal end dimension at a wedge cavity proximal end;
the cable seal housing having a proximal end;
a connector positioned at the cable seal housing proximal end for removably connecting the cable seal housing proximal end to an object;
wherein the wedge comprises a wedge grip base, the one or more wedge springs, and a plurality of axially-movable wedge grips extending from the wedge grip base, wherein the one or more wedge springs is positioned adjacent to the wedge grip base;
wherein the plurality of axially-movable wedge grips comprise a wedge grip inner surface having a pattern of relief and recess features configured to increase friction between the wedge grip inner surface and the electrical cable;
wherein under an applied load generated by the electrical cable operably connected to the wedge, the wedge is configured to transfer the applied load to the wedge housing tapered inner surface;
wherein the object is a terminal block removably connected to the cable seal housing proximal end;
wherein the terminal block has a first surface and a second surface;
wherein the adaptor further comprises: a first and a second integrated wedge system, wherein the first and second integrated wedge systems each comprise an integrated assembly corresponding to the cable seal housing, the wedge housing, the wedge, and the one or more wedge springs, wherein:
the first integrated wedge system is removably connected to the terminal block first surface; and
the second integrated wedge system is removably connected to the terminal block second surface.

2. The adaptor of claim 1, wherein the one or more wedge springs comprise:
a radial wedge spring to generate a radially-directed force; and
a longitudinal wedge spring to generate the axially-directed force to longitudinally translate the cable seal housing in the wedge cavity.

3. The adaptor of claim 1, wherein the one or more wedge springs comprise an integrated wedge spring, wherein the integrated wedge spring generates both a radially-directed force and the axially-directed force.

4. The adaptor of claim 3, wherein the cable seal housing comprises:
a central body portion extending from a proximal end to a distal end, the central body portion having an inner-facing surface and an outer-facing surface;
wherein the integrated wedge spring comprises a plurality of leaf springs extending from the central body portion distal end and terminating at a cable seal housing distal end;
the wedge connected to a leaf spring, the wedge having:
the wedge inner surface configured to grip an external surface of the electrical cable positioned in and passing through a passage defined by the central body portion inner-facing surface.

5. The adaptor of claim 4, comprising the plurality of leaf springs uniformly-radially dispersed to form a central passage longitudinally aligned with the central body portion passage for receiving the electrical cable, wherein the plurality of leaf springs is optionally four leaf springs.

6. The adaptor of claim 1, wherein the connector at the cable seal proximal end comprises threads positioned on an inner or outer surface of the cable seal housing for rotationally mating with a counterpart thread positioned on an external or internal surface of the object.

7. The adaptor of claim 1, further comprising:
a first stripped cable operably connected to the cable seal housing of the first integrated wedge system;
a second stripped cable operably connected to the cable seal housing of the second integrated wedge system;
the first stripped cable has a proximal end operably connected to a terminal block first end; and
the second stripped cable has a proximal end operably connected to a terminal block second end; thereby electrically connecting the first and second stripped cables.

8. The adaptor of claim 1, configured to withstand at least 50 pounds of load while maintaining an electrical connection between a first stripped cable and a second stripped cable.

9. The adaptor of claim 8 that is watertight, wherein at least one cable is connected to a device for measuring at least one liquid parameter.

10. The adaptor of claim 1, wherein the cable seal housing and the wedge housing are rotationally and removably connected to each other, the adaptor further comprising:
a slip clutch operably connected to the cable seal housing and the wedge housing to prevent over-tightening of the rotational connection.

11. The adaptor of claim 1 having:
a wedge expanded state configured to receive the electrical cable; and
a wedge collapsed state configured to reliably grip the electrical cable in a central passage and to transmit a load to the wedge housing tapered inner surface.

12. The adaptor of claim 1 that is watertight at a depth of up to 1 meter.

13. The adaptor of claim 1, wherein the wedge cavity tapered inner surface has a taper angle of between 1° and 40°.

14. The adaptor of claim 1, wherein the wedge is formed as a physically separate component from the cable seal housing, wherein:
   at least one of the one or more wedge springs is positioned over a proximal region of the plurality of axially-movable wedge grips.

15. The adaptor of claim 14, wherein the cable seal housing comprises a plurality of grooves positioned in a cable seal housing inner facing surface for receiving a portion of the at least one of the one or more wedge springs to connect the wedge to the cable seal housing and the portion of the at least one of the one or more wedge springs in the grooves is configured to provide axial movement of the plurality of axially-movable wedge grips relative to the cable seal housing.

16. A method of mechanically connecting an electrical cable to a universal cable adaptor, the method comprising the steps of:
   a. providing the adaptor of claim 1;
   b. inserting the electrical cable through the cable seal housing and the wedge housing;
   c. positioning a portion of the cable seal housing in the wedge cavity of the wedge housing;
   d. rotationally connecting the cable seal housing and the wedge housing, wherein upon tightening of the rotational connection, the cable seal housing reliably grips the electrical cable;
   thereby mechanically connecting the electrical cable to the adaptor.

17. The method of claim 16, further comprising the step of mechanically and electrically connecting the electrical cable that is a first electrical cable to a second electrical cable by:
   connecting a terminal block to the cable seal housing and electrically connecting a distal end of the first electrical cable to the terminal block;
   providing a second adaptor;
   repeating steps (b)-(d) to mechanically connect the second electrical cable to the second universal cable adaptor; and
   connecting the terminal block to the cable seal housing of the second universal cable adaptor;
   thereby mechanically and electrically connecting the first and second electrical cables.

18. A load-bearing universal cable adaptor comprising:
   a cable seal housing for removably securing an electrical cable;
   a wedge housing having a wedge cavity defined by a tapered inner surface of the wedge housing, wherein the wedge cavity is configured to removably receive at least a portion of the cable seal housing;
   a wedge having a plurality of wedge grips, each wedge grip having an outer surface in physical contact with the wedge housing tapered inner surface and an inner surface for gripping a cable; and
   a wedge spring that operably connects the wedge to the cable seal housing, wherein the wedge spring is configured to accommodate axial movement of the wedge grips relative to the tapered inner surface and toward a distal end of the wedge cavity, wherein the distal end has a smaller dimension than a proximal end dimension at a wedge cavity proximal end;
   wherein the cable seal housing has an inner facing surface and a plurality of grooves in the inner facing surface for receiving a portion of the wedge spring;
      wherein under an applied load generated by an electrical cable operably connected to the wedge grip inner surface, the wedge is configured to transfer the applied load to the wedge housing tapered inner surface and the wedge spring accommodates axial movement of the wedge toward the distal end of the wedge cavity to increase a gripping force on the cable by the wedge grips.

* * * * *